United States Patent

Tabor

[15] 3,687,488

[45] Aug. 29, 1972

[54] ROD AND CLEVIS ASSEMBLY

[72] Inventor: Paul C. Tabor, Troy, Mich.

[73] Assignee: Meteor Research Limited, Roseville, Mich.

[22] Filed: March 12, 1971

[21] Appl. No.: 123,579

[52] U.S. Cl..................................287/59, 287/100
[51] Int. Cl..................................F16b 7/06
[58] Field of Search.........287/100, 59, 62; 29/175 R, 29/175 A

[56] References Cited

UNITED STATES PATENTS

| | | | |
|---|---|---|---|
| 879,384 | 2/1908 | Hillman | 287/59 X |
| 598,307 | 2/1898 | Leffler | 227/86 |
| 2,067,283 | 1/1937 | Padgett | 29/175 R |
| 1,553,060 | 9/1925 | Anderson | 29/175 A |
| 763,676 | 6/1904 | Knobbs | 287/100 |

FOREIGN PATENTS OR APPLICATIONS

| | | | |
|---|---|---|---|
| 238,487 | 8/1925 | Great Britain | 151/19 R |
| 676,967 | 12/1929 | France | 29/175 A |

*Primary Examiner*—Andrew V. Kundrat
*Attorney*—Bacon & Thomas

[57] ABSTRACT

A rod having rolled threads is threaded into a tapered boss on a clevis and a jam nut on the rod has a tapered skirt frictionally embracing the tapered boss to securely lock the nut. Extruded bearing openings in the legs of the clevis provide enlarged bearing surfaces. The boss threads are formed in a clevis blank having a boss opening of substantially the same diameter as the unthreaded rod and the other end of the rod is in the opening of a substantially identical clevis blank and is welded thereto.

2 Claims, 2 Drawing Figures

PATENTED AUG 29 1972

3,687,488

INVENTOR
PAUL C. TABOR
BY
Bacon & Thomas
ATTORNEYS

ROD AND CLEVIS ASSEMBLY

BACKGROUND OF THE INVENTION

This invention relates to connectors and particularly connections between rods and clevises.

In many fields it is desirable to attach clevis devices to the ends of a rod and it has been customary to weld the rods and clevises together except in those instances where length or orientation adjustment is desired. In such cases it has been customary to fix a clevis to one end of the rod, thread an opening in the other clevis and thread the rod therein and provide a lock nut or the like to maintain the adjustment. Such previous devices, however, have necessitated machining operations and the production of clevises of two different types, thus necessitating a relatively large number of expensive operations.

SUMMARY OF THE INVENTION

The present invention comprises a rod and clevis assembly wherein a pair of clevis blanks are produced of substantially identical form and size and having attachment holes approximately equal to the diameter of a connecting rod. One end of the rod is placed in the opening in one clevis blank and fixed therein as by welding whereas the opening in the other clevis blank is threaded and the other end of the rod is provided with threads by rolling the same therein, thus producing threads having an outer diameter greater than that of the rod from which they were rolled and properly mating with the threaded opening in the clevis. In addition, a jam or lock nut is provided between the threaded rod and the last named clevis, the jam nut having a tapered skirt mating with the tapered external surface of a boss on the clevis through which the threaded opening extends. Thus, the jam nut is securely frictionally locked against loosening.

Another feature of the invention resides in forming relatively large-area bearing surfaces in openings extending through the legs of the clevis by displacing metal from relatively thin clevis legs inwardly to form elongated bearing openings.

DESCRIPTION OF A PREFERRED EMBODIMENT

Figure 1:
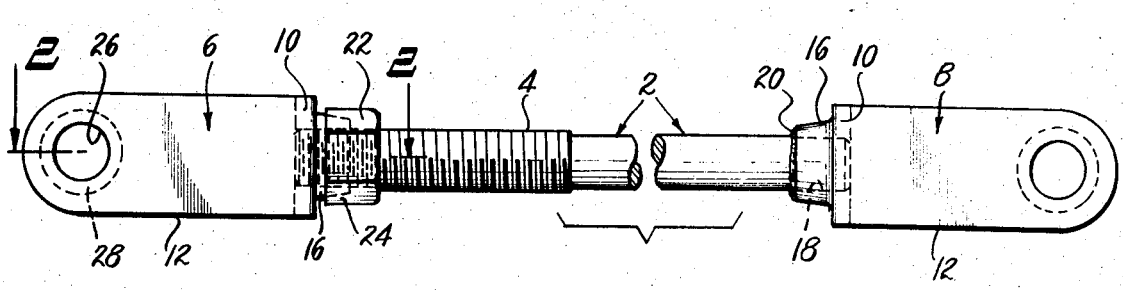
FIG. 1 is a broken side view of a rod and clevis assembly embodying the principles of the present invention.

In the drawings, numeral 2 represents a cylindrical rod to which clevis devices are to be attached. One end portion of the rod 2 is provided with threads 4 by rolling the same thereon. The rolling of threads is a known process and results in threads having a crest diameter substantially greater than the diameter of the original rod 2.

A pair of clevis device blanks 6 and 8 are formed from suitable metal and each comprises a bight portion 10 and a pair of lets 12 and 14. Formed integrally with the bight portion 10 is an outwardly tapered conical boss 16. The clevis blanks and their integral bosses 16 are preferably formed by a die-forming process, in which the metal forming the boss 16 is extruded from the bight portion 10, and each is initially provided with a cylindrical opening 18 therethrough of substantially the same diameter as the rod 2. One end of the rod 2 is inserted in the opening 18 of the clevis blank 8 and is fixed therein as by welding at 20. The opening 18 originally present in clevis device 7, however, is then internally threaded to receive the rolled threads 4 on the rod 2 and the rod and clevis 6 are then threadedly joined and adjusted to the desired length and relative orientation of the clevis device.

A jam nut 22 is internally threaded with threads matching the threads 4 on rod 2. The jam nut 22 is also provided with a skirt 24 tapered internally to match the tapered conical surface of the bosses 16. Thus, when the jam nut 22 is threaded toward the clevis 6, the tapered skirt of the nut frictionally engages the conical surface of the boss 16 when the nut is turned to approach the clevis 6 and tightly and frictionally locks the jam nut against rotation, providing a secure and reliable lock against relative movement between the nut 22 and clevis 6.

Figure 2:
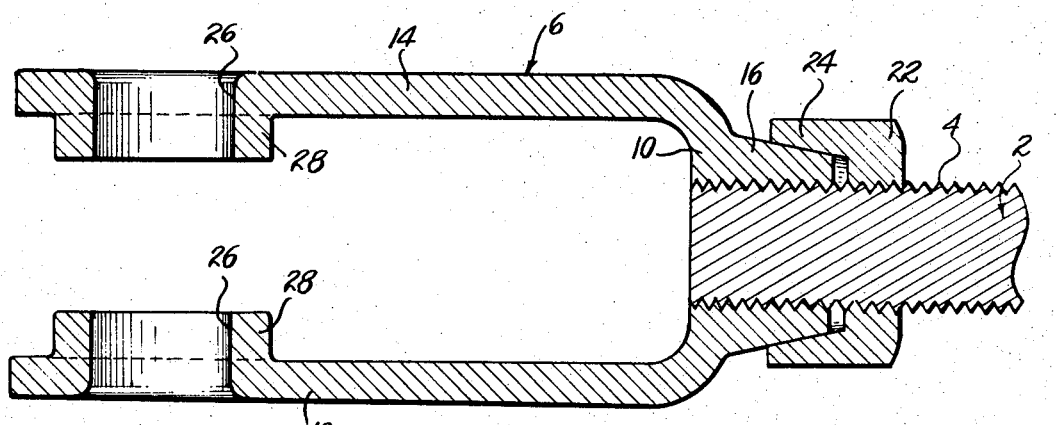
FIG. 2 is an enlarged fragmentary sectional view taken on the line 2—2 of FIG. 1.

As shown best in FIG. 2, the legs 12 and 14 of the clevises 6 and 8 are relatively thin strap-like members and are provided near their outer ends with aligned bearing openings 26 to receive a connecting pin by means of which the clevis devices are connected to other elements. If the openings 26 extended merely through the legs 12 and 14, the peripheral bearing areas thereof would be relatively small. As shown, however, the openings 26 are formed, preferably by punching operation, in a manner to extrude a portion of the metal of each leg inwardly to form an annular integral bead or extension 28, thus materially increasing the bearing area within the openings 26.

As will be apparent from the foregoing description, the extruded boss 16 extends substantially across the bight portion 10 of the clevis and thus serves as reinforcement therefor so that high tension forces in the rod 2 will not bend or distort the bight portion 10.

It is further to be noted that the internally tapered skirt 24 on the nut 22 applies a "hoop" reinforcement to the boss 16 to prevent the latter from spreading or opening up in response to tensile forces between the rod 2 and the clevis.

A further advantage of the described structure resides in the fact that the frictional wedging engagement between the skirts 24 and tapered boss 16 is much stronger than the frictional binding between the nut 22 and the threads 4 of rod 2. Thus, the nut is securely locked to the clevis and it has been found that the frictionally united clevis and nut can be rotated, as a unit, around the threads of rod 2 without loosening the nut relative to the clevis and thus maintaining a proper lock between the parts even though the described rotation may inadvertently take place. In many installations of such assemblies, forcible relative rotation of the assembly occurs under certain conditions and the assembly of the present invention will maintain its frictionally locked character even after such forcible rotation.

While a single specific embodiment of the invention has been shown and described herein, the same is merely illustrative of the principles involved.

I claim:

1. A rod and clevis assembly comprising:

a clevis member having an outwardly tapered conical boss thereon;

a threaded opening extending concentrically through said boss;

a rod having a threaded and portion threadedly engaging said threaded opening; and a jam nut threadedly engaging said threaded rod and having a skirt portion complementary to said tapered boss and frictionally embracing the same whereby to securely lock said nut against turning, said threaded and portion of said rod comprises rolled threads having an outer diameter greater than the diameter of said rod; a second clevis member having a boss thereon provided with an opening concentrically therethrough of a diameter substantially the same as that of said rod, the other end of said rod extending into said opening and being rigidly fixed therein.

2. An assembly as defined in claim 1 wherein said clevis member comprises a bight portion having said boss thereon and a pair of spaced legs extending from the ends of said bight portion, the outer end portions of said legs having aligned openings therethrough, the adjacent ends of said openings being defined by material integral with said legs and displaced inwardly therefrom whereby the axial length of said openings is greater than the corresponding dimension of said legs.

* * * * *